Dec. 11, 1956  W. H. STOUT  2,773,287
METHOD OF MANUFACTURING PLASTIC PIPE
Filed July 14, 1952
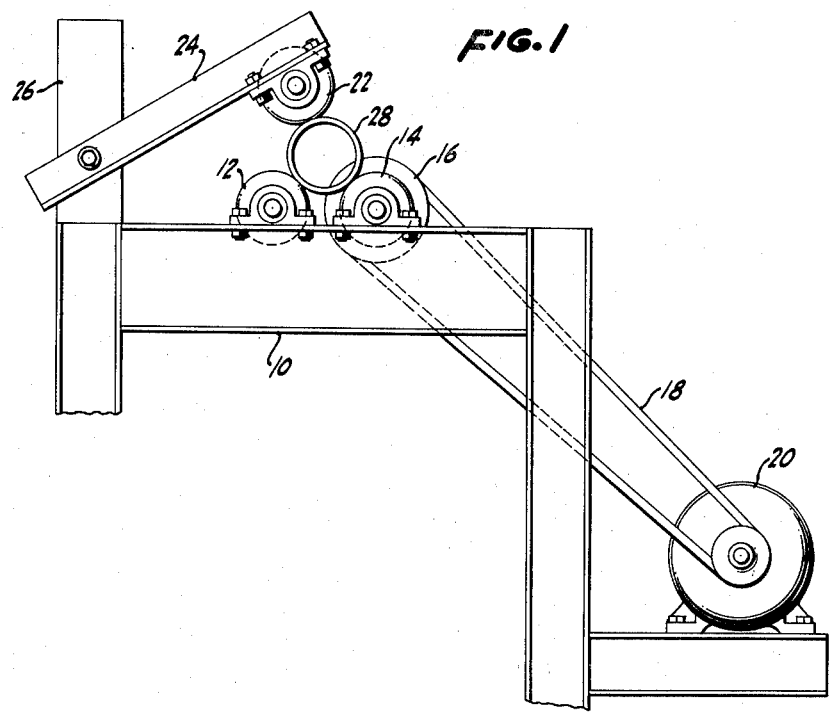
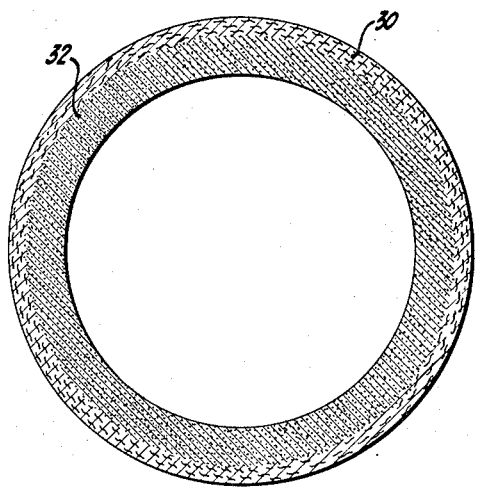
INVENTOR.
WILLIAM H. STOUT
BY
ATTORNEYS

United States Patent Office 2,773,287
Patented Dec. 11, 1956

2,773,287

METHOD OF MANUFACTURING PLASTIC PIPE

William H. Stout, Portland, Oreg.

Application July 14, 1952, Serial No. 298,690

4 Claims. (Cl. 18—58.3)

This invention relates to a method of making pipe structures, and more particularly a glass fiber reinforced plastic pipe having a very high strength in relation to its weight.

The reinforcing of molded resins with glass fibers is well known. However, when resins so reinforced are cast within a mold from which they must be extracted, the resin must be so constituted as to shrink during setting. This has been accomplished conventionally by adding a material such as a polystyrene monomer to the resin in sufficient quantity to permit its mechanical extraction from the mold after setting. The effect of this, however, has been to leave the glass fibers in a state of relaxation so that the matrix of set resin in which they are embedded must stretch or even rupture before the fibers become effective as a reinforcing agent against bursting of a pipe made of such material.

The present invention has as primary objects the elimination of this source of weakness in glass fiber reinforced plastic pipe made by previously known methods and of further adding to the strength of such pipe by compacting the glass fiber reinforcing material therein to a greater extent than has heretofore been possible.

In summary, the present invention contemplates adding to a rapidly rotating tubular mold containing the glass fiber and plastic, a relatively heavy granular material, such as sand. The centrifugal force exerted on the glass fiber and resin by this granular material is sufficient to satisfactorily compact the glass fiber and cause the resin to thoroughly and uniformly impregnate the glass fiber. This result is achieved without causing the granular material to penetrate into the outer skin of the pipe, and thus this outer skin, constituting the structurally strong glass fiber resin thin wall of the pipe is free of the granular material. Thus, while a portion of the added granular material will be coated by the resin and therefore remain with the pipe after the resin has been set, the presence of the granular material at the inner surface of the formed pipe in nowise weakens the essential, or glass fiber resin, outer shell of the pipe.

The invention also contemplates the employment, as a mold, of a disposable tube of cardboard or the like, the use of which renders it unnecessary to incorporate any shrinking agent in the resin because the disposable tube may be either left on the molded pipe as a protective cover or stripped from it and discarded.

A detailed description of the pipe forming process of the invention and the pipe structure resulting therefrom is set forth in the following description, and in the drawing, in which:

Figure 1 is a view in end elevation of a simple form of apparatus that may be used to produce the pipe according to the process of the invention; and Figure 2 is an enlarged view in transverse cross-section of the pipe structure produced by the subject process.

The pipe molding apparatus of Figure 1 comprises a supporting frame 10, an idler roller 12 carried thereby, a drive roller 14 carried thereby and having a drive sheave 16 engaged by belt 18 which is driven by motor 20, and a second idler roller 22 carried by frame 24 having a pivotal connection with upright members 26 of frame 10. A disposable tubular mold form 28 which may, for example, consist of cardboard completes the apparatus.

The first step in the formation of the pipe of the invention is to form a thin walled annulus of glass fiber and to deposit this annulus within the mold 28. This may be conveniently done by rolling a glass fiber mat up on a mandrel, such as an aluminum rod, so as to form a number of wraps of the glass fiber mat on the rod, and then inserting the rod within the mold 28 and withdrawing it therefrom so as to leave the glass fiber annulus within the mold. The motor 20 is then energized to rotate the mold 28 at a high rate of speed, as, for example, about 1600 R. P. M. Rotation of the mold tends to throw the glass fiber mat outwardly into engagement with the mold wall.

The next step in the formation of the pipe is the deposition within the mold 28 interiorly of the glass fiber annulus of the plastic and the granular material. This may be conveniently done by introducing a pipeline and sprayhead system, not shown, into the mold 28 axially thereof and so as not to engage the glass fiber annulus while the mold is rotating. The pipeline and sprayhead system is withdrawn at a uniform rate of travel from the mold while it successively deposits by a radial rotative spraying action the following materials against the glass fiber annulus: a suitable catalyst for the plastic or resin, if such be desired; a suitable accelerator for the resin, if such be desired; the resin; and the relatively dense granular material, such as sand. After the pipeline and sprayhead system has deposited these materials within the mold substantially uniformly lengthwise thereof, hot air, from a source not shown, is passed through the mold to cure and set the resin. After the pipe has been formed in this manner, the mold may be stripped or soaked away from it or, if desired, it may be left on the pipe as a protective covering.

Any plastic or resin material may be used which has the property of being able to set while being subjected to centrifugal action, but the preferred plastic or resin materials, of course, are those which will give the pipe a high bursting strength. Polyester resins are well suited for this purpose. In practice, I have utilized conventional catalyst and accelerator additives with these polyester resins, the catalyst and accelerator materials being utilized in an amount approximately 2% by weight of the polyester resin for each of these additives. When the accelerator and catalyst additives are present in approximately these amounts, I have found that 170° F. is a satisfactory curing or setting temperature for the resin.

In order that there may be sufficient force applied to the resin within the mold to form a highly compacted glass fiber resin outer wall in which the glass fiber is thoroughly covered by the resin, it is preferable that a greater amount of granular material be deposited within the mold than can be coated by the amount of resin which has been deposited. By using one part of volume of resin and at least two parts by volume of sand, preferably an excess of sand, this result is achieved. After the resin has been thermally set, the excess granular material may then be readily removed from the molded pipe.

Any granular material may be used as the "centrifuging agent" which has a relatively higher specific gravity than the particular plastic or resin employed, although preferably it should be wettable by the plastic. Entirely satisfactory results have been obtained when using sand as the granular material. Ground, or crushed, limestone and ground, or crushed, volcanic or igneous rock are other examples of the additive materials which may be used.

The disposable tubular mold 28 may be of any satisfactory material, such as relatively heavy stock multi-ply cardboard. When a multi-ply cardboard tube is used as the tubular mold form, it may be employed in such form as to incorporate all or a portion of the tube as an integral part of the finished pipe. For example, if the various layers or plies of cardboard are merely spot-glued together, the entire cardboard tube, or at least a substantial portion thereof, will become impregnated with the pipe-forming resin and be embodied in the finished pipe as a permanent part thereof. On the other hand, if a glue coating is spread rather thickly between any of the layers or plies of the cardboard tube before the tube is used in the pipe-forming process, the glue forms a barrier to the resin, with the result that the spot-glued plies of the tube located internally of the glue coating will become impregnated and be embodied in the finished pipe, while those layers of the tube disposed outwardly of the glue coating may be stripped off of the finished pipe, as by soaking. If it is desired to strip off the entire cardboard tube, a resin barrier such as glassine may be used as a liner.

A cross-sectional view of a pipe formed according to the above-described process is shown in Figure 2. The pipe comprises an outer layer 30 of glass fiber and resin and an inner relatively thicker layer 32 of resin coated sand. The exposed surface of the inner layer 32 may, if desired, be provided with a film-like coating of resin to reduce friction losses in the pipe when it is used as a fluid conduit. After the pipe has been formed, with the resin being thermally set, the excess granular material is removed from the pipe and then the inner resin coating is applied thereto and caused to set.

By the method of the present invention it has proved feasible to make, for example, four-inch pipe having a bursting strength in excess of 400 pounds per square inch, using a glass fiber mat of an initial density of two ounces to the square foot and compressing it to one thirty-second of an inch in the final pipe wall; the balance of the pipe wall being made of resin and sand and the entire wall being only one-eighth to three-sixteenths of an inch thick.

What is claimed is:

1. A method of forming high strength plastic pipe which comprises disposing a mat of glass fiber against and around the inner surface of a tubular member, rotating said member about its longitudinal axis, successively depositing within said rotating member a quantity of thermosetting resin and a quantity of relatively dense granular sand-like materials of specific gravity higher than that of said resin whereby to exert pressure on said fibers during rotation while said resin infiltrates between and around said fibers and coats said granular material, and thereafter subjecting said resin to heat to effect the thermosetting thereof while continuously rotating said member, whereby a high strength plastic pipe is obtained characterized in structure by an outer portion enriched in said glass fibers substantially dispersed as a plurality of layers through said resin, and an inner portion enriched in said granular sand-like material.

2. The method as set forth in claim 1 wherein the interior surface of the inner portion enriched in granular material is thereafter coated with a film-like layer of said resin.

3. The method as set forth in claim 1 wherein the tubular member comprises a disposable tubular mold and wherein sand is employed as the granular material.

4. The method of claim 1 wherein for each part by volume of resin at least two parts by volume of sand are used.

References Cited in the file of this patent

UNITED STATES PATENTS

| | | |
|---|---|---|
| 1,343,191 | Allcutt | June 15, 1920 |
| 1,908,170 | Naugle et al. | May 9, 1933 |
| 2,120,309 | Carson | June 14, 1938 |
| 2,187,024 | Fowler | June 16, 1940 |
| 2,248,098 | Cornelius et al. | July 8, 1941 |
| 2,525,070 | Greenwald et al. | Oct. 10, 1950 |
| 2,552,599 | Stout | May 15, 1951 |
| 2,606,574 | Lefebvre | Aug. 12, 1952 |
| 2,614,058 | Francis | Oct. 14, 1952 |
| 2,653,887 | Slayter | Sept. 29, 1953 |